United States Patent [19]

Ritman

[11] Patent Number: 4,648,511
[45] Date of Patent: Mar. 10, 1987

[54] CONTAINER FOR HOLDING FLATWARE AND DINNERWARE FOR SERVING FOOD

[76] Inventor: Joost R. Ritman, Bloemgracht 15-19, NL-1016 KB Amsterdam, Netherlands

[21] Appl. No.: 734,849

[22] Filed: May 16, 1985

[51] Int. Cl.[4] ............... A47G 23/06; B65D 21/02; B65D 43/16; A45C 11/20
[52] U.S. Cl. .......................... 206/541; 206/508; 206/545; 220/339; 220/306; 229/2.5 R
[58] Field of Search ............ 206/541, 542, 543, 544, 206/545, 508; 220/339, 306; 229/2.5 R

[56] References Cited

U.S. PATENT DOCUMENTS

| 3,633,785 | 1/1972 | Cyr | 206/545 |
| 3,811,560 | 5/1974 | Schilling | 206/541 |
| 4,060,173 | 11/1977 | Dahl | 220/339 |
| 4,098,430 | 7/1978 | Matthesis | 220/339 |
| 4,244,470 | 1/1981 | Burnham | 229/2.5 R |

FOREIGN PATENT DOCUMENTS

| 2038164 | 7/1980 | United Kingdom | 206/541 |
| 2061880 | 5/1981 | United Kingdom | 229/2.5 R |

*Primary Examiner*—George E. Lowrance
*Attorney, Agent, or Firm*—Allegretti, Newitt, Witcoff & McAndrews, Ltd.

[57] ABSTRACT

The invention relates to a container for holding flatware and dishes for use in serving meals on board an aircraft, for example, comprising a rectangular tray-shaped sectioned bottom member hinged to a cover member to form an integral case. To permit dishes holding food, particularly hot meals, to be removed from the closed container and reinserted into it, the container is provided with an opening in a side wall.

1 Claim, 3 Drawing Figures

CONTAINER FOR HOLDING FLATWARE AND DINNERWARE FOR SERVING FOOD

The present invention relates to a container for holding flatware and dinnerware for use in serving meals on board an aircraft, for example.

The object of the invention is to provide a container of the foregoing type to permit dishes filled with food, particularly trays holding a hot meal, to be taken from the container and reinserted into it when the lid on the container is closed.

This is accomplished by providing the container with an opening in one of its side walls not hingedly joined to the cover member.

Due to this particular construction, a tray or dish holding a hot meal, for example, may easily be taken hold of and removed from the container without the necessity of opening the container by its cover member. Of prime advantage is the convenience of filling stacked containers with the various courses of a meal. The cold food items and the flatware may be put in the container in advance whereupon the container is closed, while the hot course can be placed into the container just prior to serving without the tedium of having to reopen the container by its cover member. A more efficient operation is the obvious result.

Additional objects, advantages and features of the invention will become apparent from the following description with reference to an embodiment illustrated in the drawings, in which.

Figure 1:
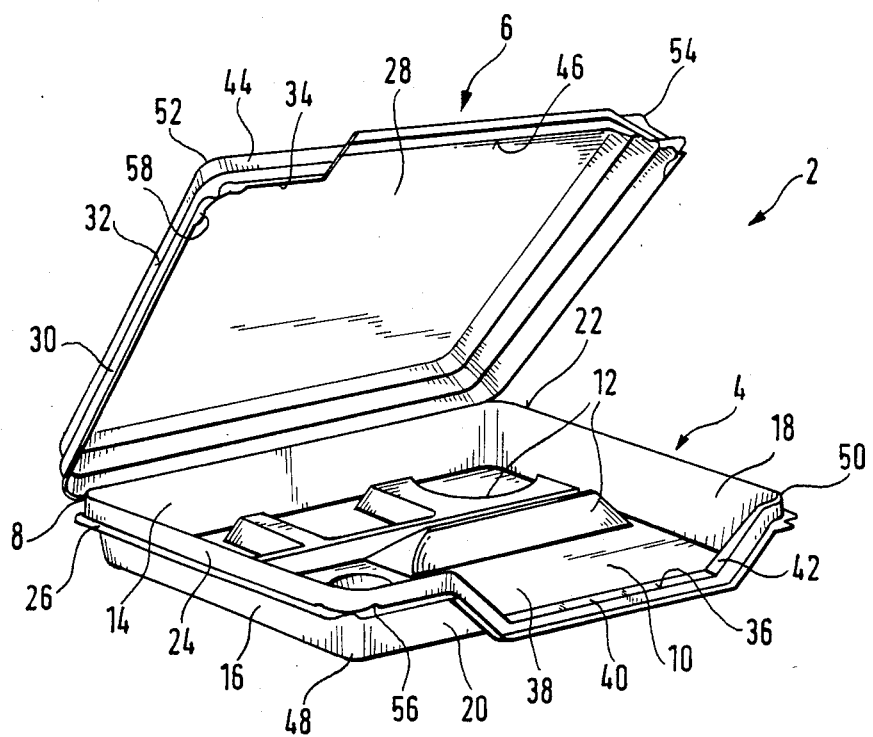
FIG. 1 is a perspective view of the container according to the invention with the cover member being in an open position.

Referring to the drawings, the container 2 comprises a bottom member 4 and a cover member 6 joined together by hinge means 8.

The bottom member 4 comprises a bottom wall 10 sectioned into dished portions 12 and four raised walls slanting slightly outwardly, namely, rear wall 14, two side walls 16,18, and front wall 20.

The upper edge of the side walls is provided with a downwardly bent rim 24 slightly flaring outwardly and being provided at its lower edge with an approximately horizontally extending flanged section 26.

The cover member 6 comprises the surface area 28 proper and a downwardly directed continuous side wall 30. The sidewall 30 is stepped two fold to form two flanged sections for engaging the rim 24 and the flange 26 thereon provided on the side walls of the bottom member 4 of the container 2. The first horizontally extending flange 32 of the side wall 30 is for placement upon the edge 22 of the bottom member 4, and the second horizontally extending flange 34 will accordingly be supported by the flange 26 on the rim 24 of the bottom member 4.

The bottom and top parts of the container 2 are joined together in back by hinge means 8 provided along the flange 26 of the bottom member 4 and the flange 34 of the cover member 6, respectively.

The front wall 20 of the bottom member 4 has a cutout or opening 36 therein for direct access to a compartment 38 when the container 2 is closed. The bottom 40 of the cutout or opening 36 is elevated to a place above the bottom 10 of the bottom member 4. The side walls 42 defining the opening 36 are inclined at an angle and terminate at a distance from the container side walls 16,18.

The front wall 44 of the cover member 6 is also provided with an opening or cutout 46 in opposite alignment with the opening 36 in the bottom member 4 and preferably is of the same shape. The opening 46 extends approximately up to the top surface of the cover member 6, as it is shown to the best advantage in FIG. 3.

In the area of the corners 48,50 of the front wall 20 of the bottom member 4 and in the area of the corners 52,54 of the front wall 44 of the cover member 6, there are provided interlocking elements 56,58 in the form of inwardly directed flanges and recesses.

The opening 46 in the front wall of the cover member 6 may be omitted if the bottom member 4 is made deeper and the cover member 6 shallower.

Figure 2:
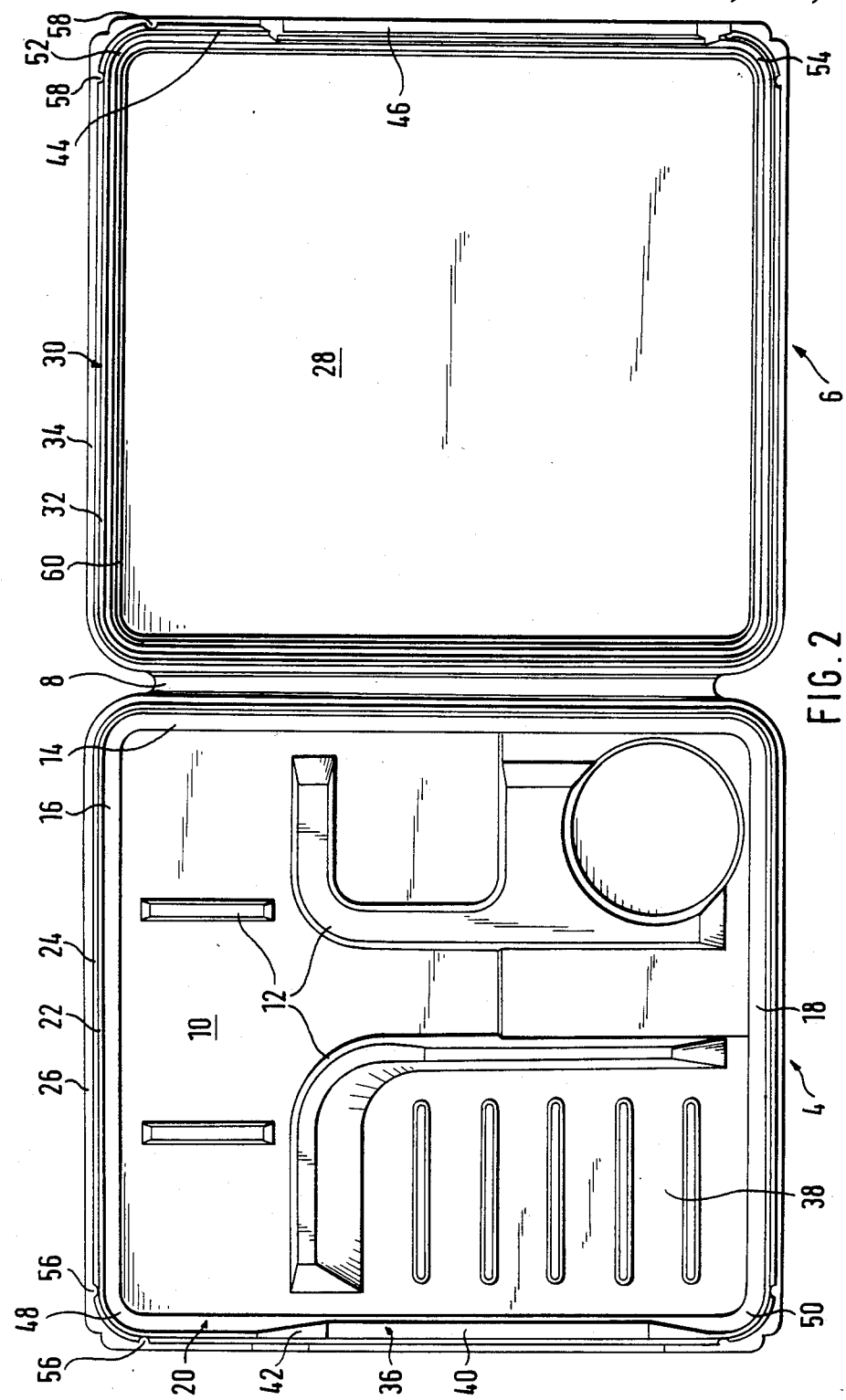
FIG. 2 is a top plan view of the container of FIG. 1, with the cover member being completely opened up.

The dished sections in the bottom member 4, shown in FIGS. 1 and 2, are optional. Such sections may be provided and shaped as individual requirement may demand.

The container 2 is made of a plastic material, molded by suitable machinery, with a colored opaque plastic material being used for the bottom member and a transparent plastic material for the cover member.

Figure 3:
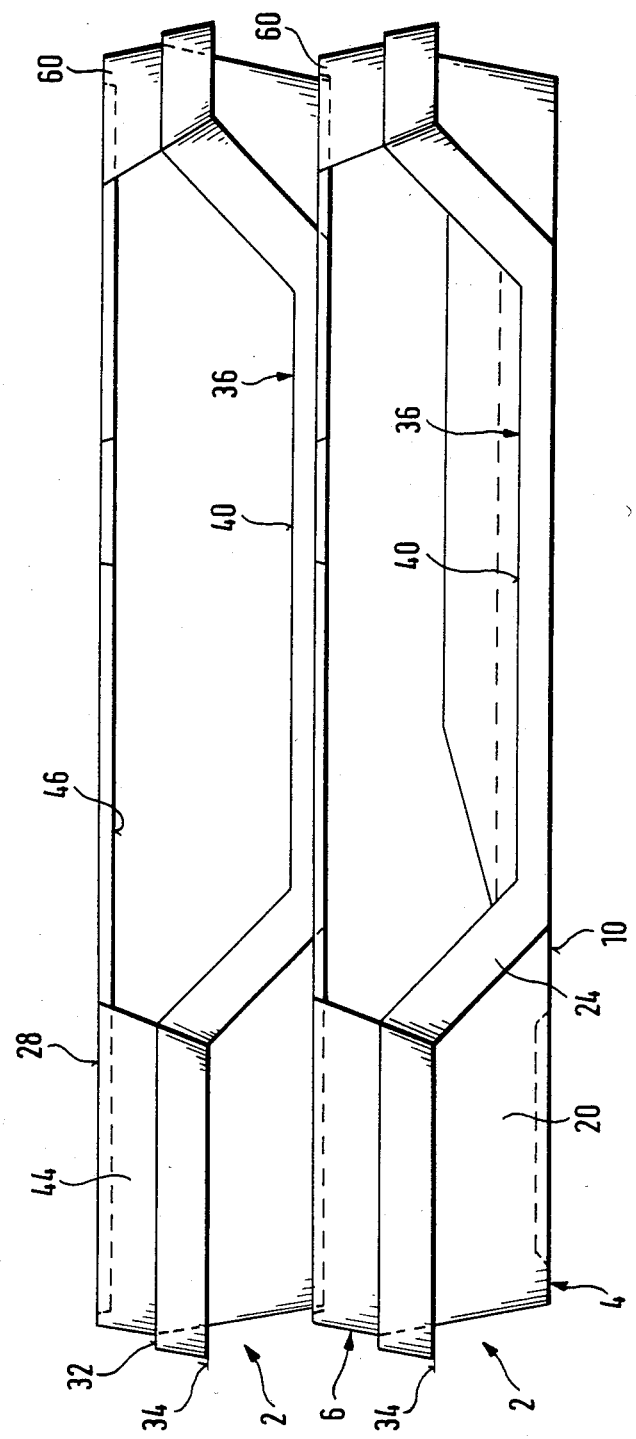
FIG. 3 is a front view of two stacked containers in the closed position.

The containers are adapted to be stackable for which purpose the cover member 6 is provided on its upper surface with a stacking edge 60 extending around the periphery, as it is shown in FIG. 3. The space enclosed by the stacking edge serves to receive the bottom part of another container.

I claim:

1. A container for holding flatware and dinnerware comprising:
   a rectangular tray-shaped sectioned bottom hinged to a cover member to form an integral case, said container having front, rear and side walls
   an opening in said front wall to permit inserting and removing a meal dish without removing the cover and for storing said dish completely inside said container said opening being formed by a recess in the front wall of the bottom member and an opposed recess in the front wall of said container member,
   a horizontally-extending peripheral flange on the outside of said side walls,
   a downwardly-extending side wall on said cover member which is stepped twice to form flanged sections one of which rests on the top edge of said container side wall and one of which rests on said peripheral flange when said cover is closed on the container,
   a curved locking element formed in said peripheral flange in the area of the corners where said side and front walls meet,
   opposed complementary curved locking elements formed in said downwardly-extending side wall on said cover member, and
   a stacking edge peripherally extending above the top surface of said cover member to facilitate stacking one closed container on another.

* * * * *